(12) United States Patent
Moore

(10) Patent No.: US 6,269,977 B1
(45) Date of Patent: Aug. 7, 2001

(54) STACKABLE CONTAINER COVER

(76) Inventor: Kim Ira Moore, 2008 Haven Pl., Newport Beach, CA (US) 92663

( * ) Notice: Subject to any disclaimer, the term of this patent is extended or adjusted under 35 U.S.C. 154(b) by 0 days.

(21) Appl. No.: 09/491,992

(22) Filed: Jan. 26, 2000

(51) Int. Cl.[7] .............. B67D 5/60; B67D 3/00; B65D 25/40; B65D 35/38; B65D 5/72
(52) U.S. Cl. .............. 222/143; 222/570; 222/481
(58) Field of Search .................. 222/143, 570, 222/478, 431, 485, 481, 482

(56) References Cited

U.S. PATENT DOCUMENTS

| | | | |
|---|---|---|---|
| D. 335,082 | 4/1993 | Delorey | D9/434 |
| D. 359,236 | 6/1995 | Spafford | D9/434 |
| 2,873,052 | * 2/1959 | Atherton | 222/570 |
| 3,263,876 | 8/1966 | Perfetto | 222/569 |
| 4,022,344 | 5/1977 | Roamer | 220/4 A |
| 4,034,901 | 7/1977 | Kirk | 222/481.5 |
| 4,865,233 | 9/1989 | Kain | 222/570 |
| 4,893,723 | 1/1990 | Seabolt | 220/85 SP |
| 5,062,550 | * 11/1991 | Singh | 222/481 |
| 5,388,715 | 2/1995 | Schwindt | 220/354 |
| 5,893,489 | 4/1999 | Giarrante | 222/482 |

FOREIGN PATENT DOCUMENTS

| | | | |
|---|---|---|---|
| 939283 | 1/1974 | (CA) | 190/148 |
| 1070003 | * 6/1954 | (FR) | 222/478 |

* cited by examiner

Primary Examiner—Kevin Shaver
Assistant Examiner—Stephanie Willatt
(74) Attorney, Agent, or Firm—W. D. English, III

(57) ABSTRACT

A stackable and reusable, container cover is disclosed for safe, sealed, and protected confinement of fluid contents therein to prevent, among other matters, spillage, contamination, evaporation and hardening of the fluid contents. The cover consists of a single molded disc shaped device with an elevated flat surface, platform for supporting another container thereon. The cover also provides for multiple and different sized spouts for various and particular flow rates and flow confinements, and angled in such manner for easy drip less pouring. In addition, the cover provides for a significant step in providing a very convenient snap on, attachment, and snap off, detachment means for reuse of the cover on yet another container.

9 Claims, 6 Drawing Sheets

STACKABLE CONTAINER COVER

BACKGROUND OF THE INVENTION

1. Field of the Invention

The invention relates to reusable covers and spouts for containers of fluids. More specifically, the invention discloses a stackable cover with more than one different sized pouring spout, and having a convenient disengagement means particularly designed for a conventional paint can.

2. Description of the Prior Art

Once a paint can is delivered from the factory or retail outlet to a site, the securely fastened lid must be removed to access the paint which is usually poured over the rim of the can into a more convenient paint container. By such traditional pouring techniques, paint is invariably spilled creating a mess, and in any event spills over the side of the can making a very messy can and anything with which the can comes in contact. Then after pouring the desired amount of paint in an appropriate receptacle for painting, the factory lid must again be secured on the paint can to prevent spillage, contamination, hardening and evaporation of the paint therein by pounding the periphery of the cover rim with a hammer, or the equivalent thereof, which invariably causes more spillage, splashing and squirting of the paint from the recessed can rim that receives the cover. For the lay person, painting a house can be a very frustrating and messy experience, and even for the professional, spills and messes still occur.

Replaceable and reusable covers for securing and enclosing typical paint cans in storage or in use have been in use for some time, and some of these covers also have provided a non drip spout to pour the paint from the paint can into another receptacle or trough for convenient access for a paint brush, paint spray gun, or roller for painting.

One such paint can cover disclosed in U.S. Pat. No. 5,893,489 suggested a hinged flip top cover with a single vertical spout and a shelf for wiping a paint brush. Another cover disclosed in U.S. Pat. No. 5,388,715 suggested a similar cover also with a single vertical spout and a stirring slot. Still another cover disclosed in U.S. Pat. No. 4,893,723 conceived a cover with a vertical spout and a removable hatch to yield a serrated shelf for wiping a brush. Yet another similar paint can cover disclosed in U.S. Pat. No. 4,865,233 suggested a somewhat vertical spout and a central slot for insertion there through of a paint stirring device. In the paint can cover disclosed in U.S. Pat. No. 4,034,901 a cover is designed to snap in to the paint can rim and is provided with a single vertical spout. In the cover disclosed in U.S. Pat. No. 4,022,344, a paint can cover is disclosed that resembles another half paint can with a spout off its side disposed on top of the paint can. In yet another cover disclosed in U.S. Pat. No. 4,022,344, a very thick cover symmetrical with the can and having a lateral spout is disclosed wherein the cover is again snapped within the rim of the paint can. In yet the more distant art of U.S. Pat. No. 3,263,876, a rim snap on lid was provided with a single, central vertical spout. A similar Canadian Pat 939,283 disclosed a rim snap on cover with a very large vertical spout.

Although the prior art of record amply covered the concept of a removable and reusable paint can cover having a rim snap on capability and a convenient pouring spout, there remains a long standing need for still other attributes. That long standing need includes the capability to pour paint from a large spout as well as a small spout, the ability to stack the covers or the paint cans with the covers thereon, and the ability to more easily remove, to snap on and snap off, and reuse the lids/covers once attached. There is no disclosure nor suggestion in any of the prior art to provide for more than one sized pouring spout. In addition the spouts all tend to exit the cover vertically from the paint can cover, thus preventing the ability to stack the lids or paint cans with lids attached. In the invention disclosed herein, at least two different sized spouts are provided exiting the paint can cover diagonally from the side thereof, thereby yielding a strong and flat platform on top of the cover. The flat top acts as a sturdy platform, and thereby enables one to stack the covers in a retail outlet and, of even greater importance, enables paint cans to be stacked several deep with this cover affixed on each. Still a further improvement over the prior art is a peripheral, elevated lip on the snap on lid which substantially improves the ability of one to attach, snap on, and especially to detach, snap off, and remove the cover from the paint can.

SUMMARY OF THE INVENTION

The invention is a removable and reusable, cylindrical container cover/lid with the appearance of a "flattened top hat" or "flying saucer" that is provided with at least two different sized spouts extending from the peripheral, inclined side thereof, thereby leaving a flat top on the cover structure. The flat top hub of the container cover forms a mounting platform and enables other containers with similar covers to be stacked; the flat platform also enables several container covers to be stacked on top of each other for storage as well. The base and rim of the cover is provided with a circumferential lip that extends slightly above the rim of the paint can when the peripheral male, protruding ring at the cover base is snugly inserted inside the peripheral and recessed female ring on the rim of the paint can. The small gap between the lip of the cover and the rim of the paint can on which the cover is mounted allows one to conveniently insert and turn a screwdriver there between to easily and safely separate the lid from the paint can. The lip extension also diminishes and provides a shield from paint splatter in a vertical direction when the invention cover is applied to a paint can that may have paint in the can rim recess, and in addition, the extended lip offers a broader surface and greater leverage to more easily attach the cover to the container. In a second embodiment, a plurality of notched flanges extending radially from the flat top hub securely prevents movement and makes more stable a container stacked on top of the cover. The invention thusly described provides a convenient means for safely securing, sealing, stacking and pouring paint from a typical paint can by such means that the cover may conveniently be disengaged and reused on other paint cans.

OBJECTS OF THE INVENTION

It is an object of the invention to provide a fluid container cover/lid that provides a built in means for mounting and dismounting the cover for reuse on multiple containers.

Another object of the invention is to provide a container cover whereby the covers can be stacked and the containers with attached covers can likewise be stacked.

Yet another object of the invention is to provide a container cover with at least two different sized and sealed spouts for pouring the fluid therein at different rates or smaller confines.

Still a further object of the invention is to provide a container cover that safely and conveniently seals the fluid in an opened paint can from spillage, contamination, exposure, evaporation, and hardening.

The foregoing addressed objects of the invention together with other objects of the invention that will emanate therefrom, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawing and descriptive matter in which there is illustrated preferred embodiments of the invention.

BRIEF DESCRIPTION OF THE DRAWING

The invention will be better understood and objects other than those set forth above will become more readily apparent when consideration is given to the following detailed description thereof. Such description makes reference to the annexed drawing of several figures, wherein.

DETAILED DESCRIPTION OF A PREFERRED EMBODIMENT

Figure 1:
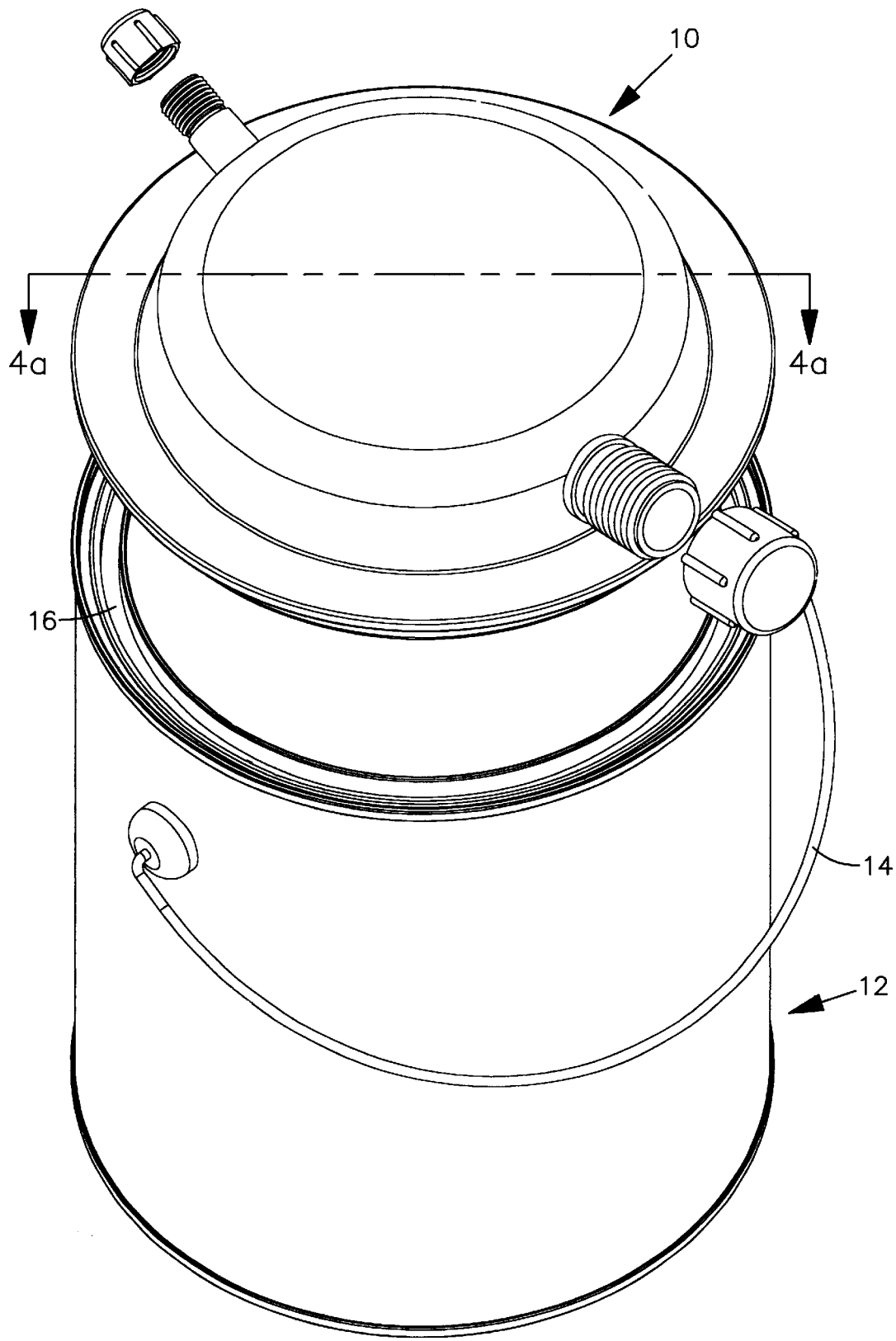
FIG. 1 depicts a perspective view of the invention container cover suspended above a typical paint can to which the cover is to be mounted.

FIG. 1 depicts an overall perspective view and the general environment of the invention. In FIG. 1, the invention cover 10 is illustrated suspended above a typical paint can, container 12 with carrying handle 14 and recessed rim 16. A cross section 4a—4a is illustrated in FIG. 4 more clearly depicting how cover 10 snuggly and conveniently secures and seals off the fluid contents of the container, paint can 12. Although there is illustrated in FIG. 1 a typical gallon sized paint container, it will be apparent that any smaller or larger sized fluid container would be applicable as well.

Figure 2:
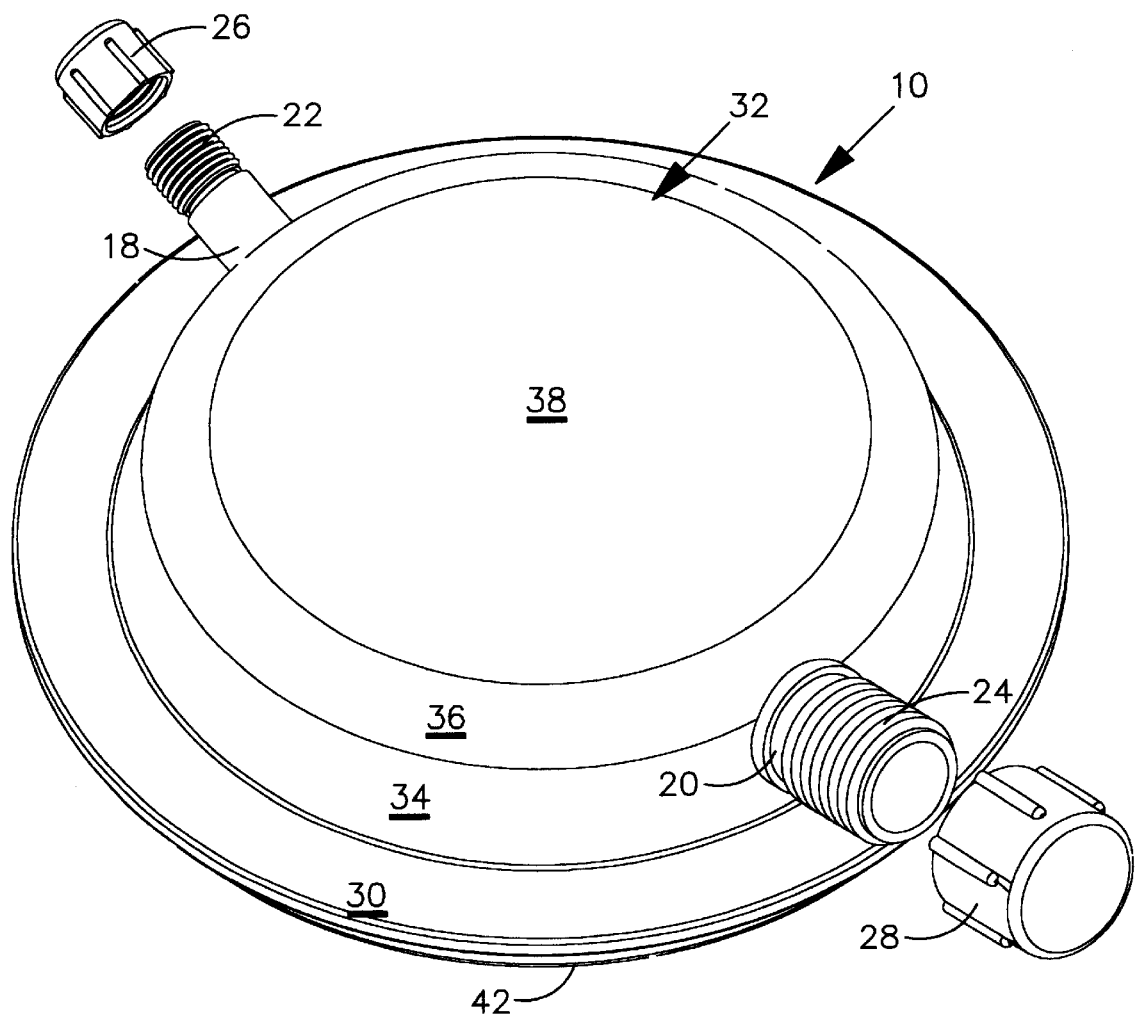
FIG. 2 illustrates a top perspective view of the container cover itself.

FIG. 2 illustrates a top perspective view of the invention cover 10 by itself. Cover 10 is provided with at least a first and second spouts 18 and 20, respectively, with threaded ends 22 and 24, respectively, for sealed attachment of caps 26 and 28, respectively. It can be noted that spout 18 is generally of a smaller diameter than spout 20 to permit a slower flow rate of fluid there through or to confine fluid flow to a smaller and tighter flow area It should be noted also that more than two sized spouts could be applied as well to the invention at hand to yield a variety of fluid flows; however, in the preferred embodiment, only two spouts are considered.

Figure 3:
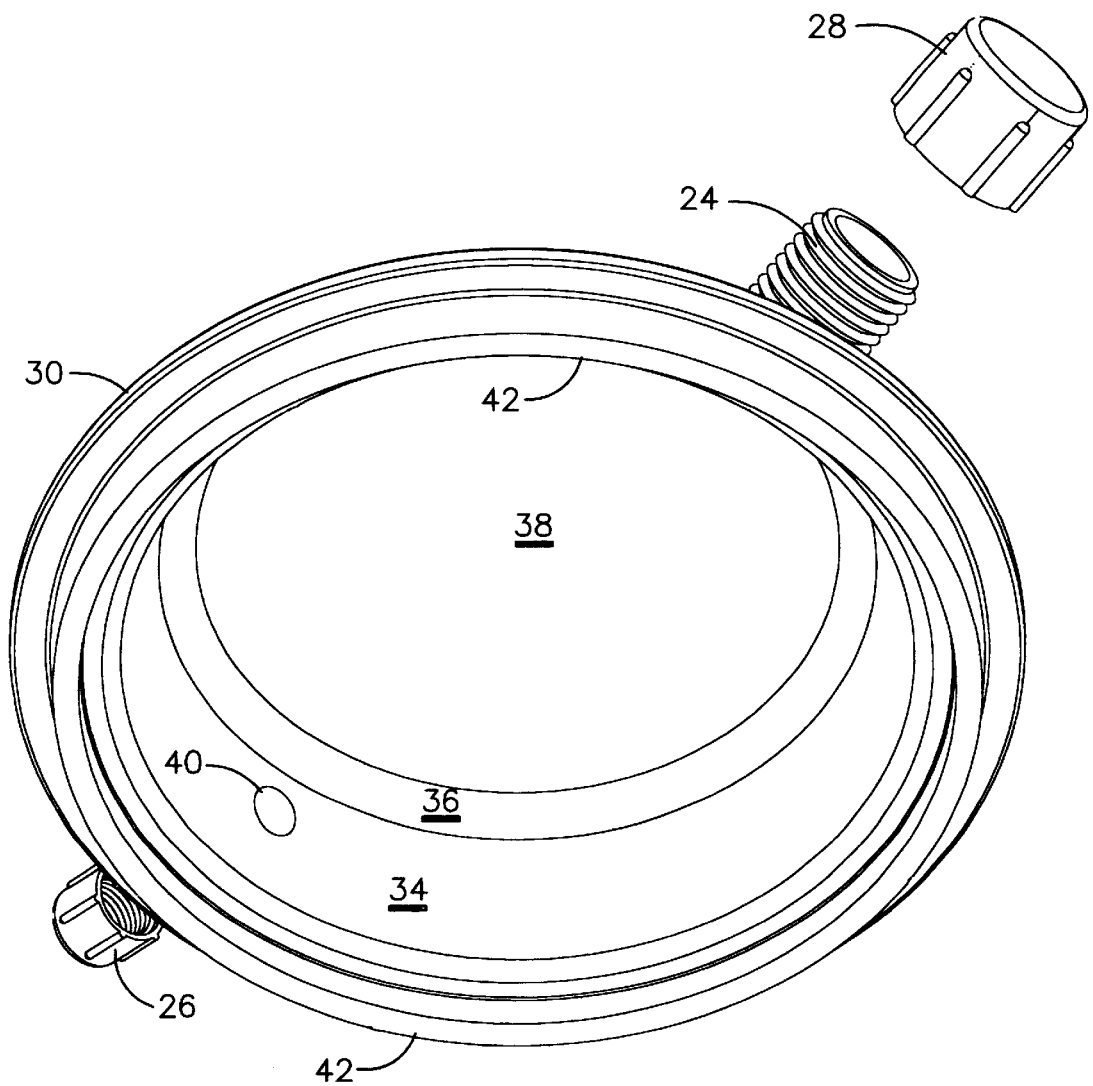
FIG. 3 illustrates a bottom perspective view of the container cover of FIG. 2.

Referring now to FIGS. 2 and 3, wherein FIG. 2 illustrates the top perspective view of cover 10 and FIG. 3 illustrates the bottom perspective view of cover 10, it can be observed that cover 10 may resemble a flattened top hat or an inverted bowl shaped device comprising a base and having a ring shaped lip 30 that traverses the periphery of an elevated hub 32 having inclined sides 34 with beveled edges 36 leading to a flat plateau or platform 38. It is platform 38 that serves as the surface for stacking multiple containers as needed. It should be noted that first spout 18 emanates from an internal hole 40 in the inclined side 34 of hub 32, in similar manner as does second spout 20 (hole not shown) thereby causing spouts 18 and 20 to extend perpendicularly from the surface of side 34, but diagonally from the plane of rim 30 and cover 10 in general. The advantage to this inclined orientation is that spouts 18 and 20 not only extend from cover 10 in a manner that does not prevent or interfere with the unique stacking ability of covers 10 along with several containers 12, but also the diagonal/inclined orientation of spouts 18 and 20 permit much easier and controlled pouring ability of the fluid from container 12.

Figure 4A:
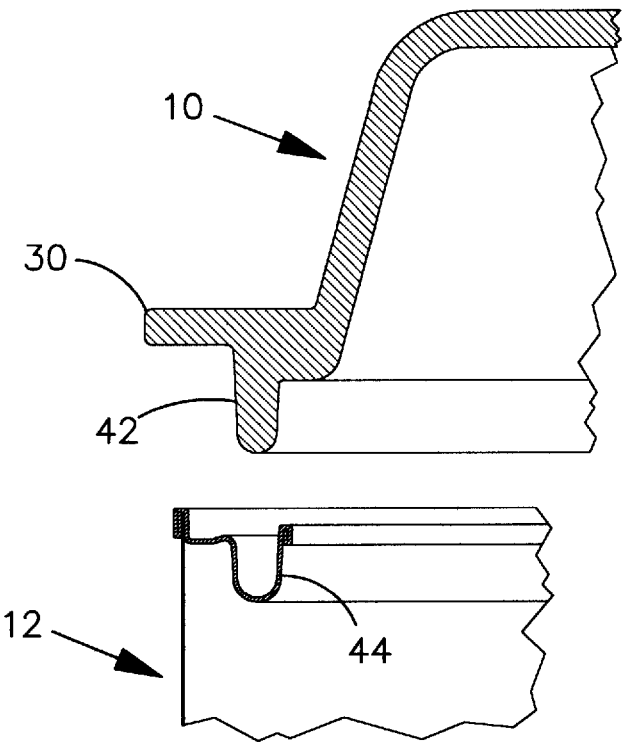
FIG. 4a illustrates a side, elevational and cross sectional view of FIG. 1, taken across the diameter of the cover suspended above the container in which only the outer rim section of the cover and container are depicted.
Figure 4B:
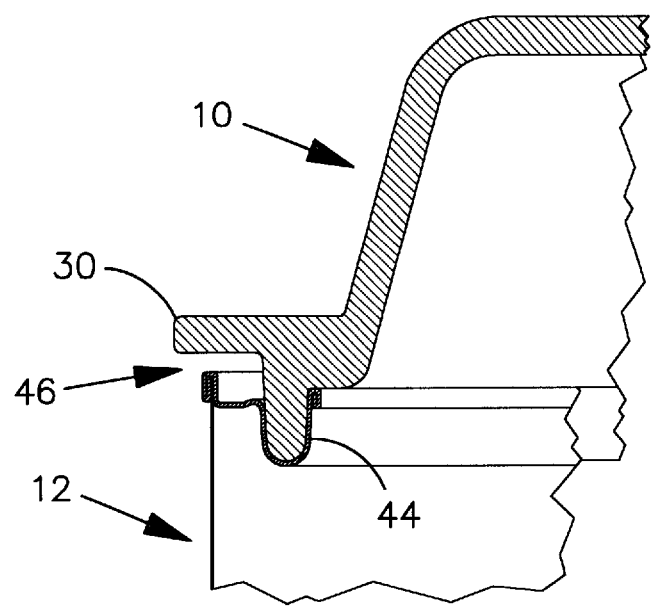
FIG. 4b illustrates FIG. 4a wherein the cover is attached to the container.

Referring now to FIGS. 3 and 4, the unique attaching and sealing function of cover 10 is illustrated. In FIGS. 3, 4a and 4b, a vertical male ring 42 is configured for snugly fitting into a circumferential, recessed female ring 44. Cover 10 may conveniently be mounted on container 12 by pushing down or pounding with a soft hammer on peripheral lip 30 forcing and sealing element 42 snugly into element 44. Once so assembled, cover 10 seals and insulates the fluid contents of container 12 from the elements, thereby inhibiting contamination, evaporation and hardening of the fluid contents. When container 10 has fulfilled its useful purpose, i.e. it's empty, cover 10 may be very conveniently be removed for use on another container, by inserting a screwdriver into a peripheral slot 46 and turning to lift cover 10 sufficiently to remove it from container 12.

Figure 5:
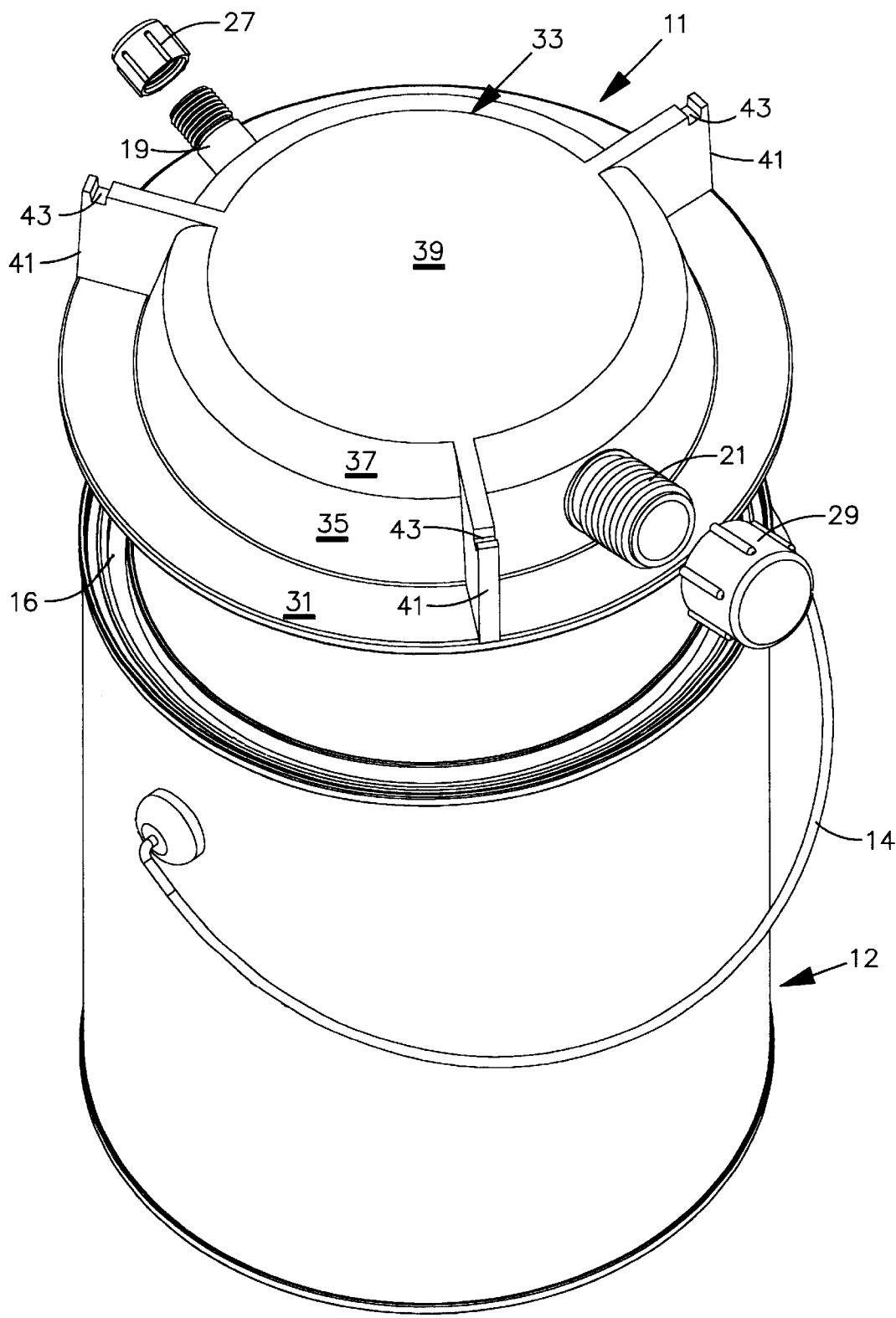
FIG. 5 depicts a perspective view of an alternate embodiment of the invention cover suspended above a typical paint can to which the cover is to be mounted.
Figure 6:
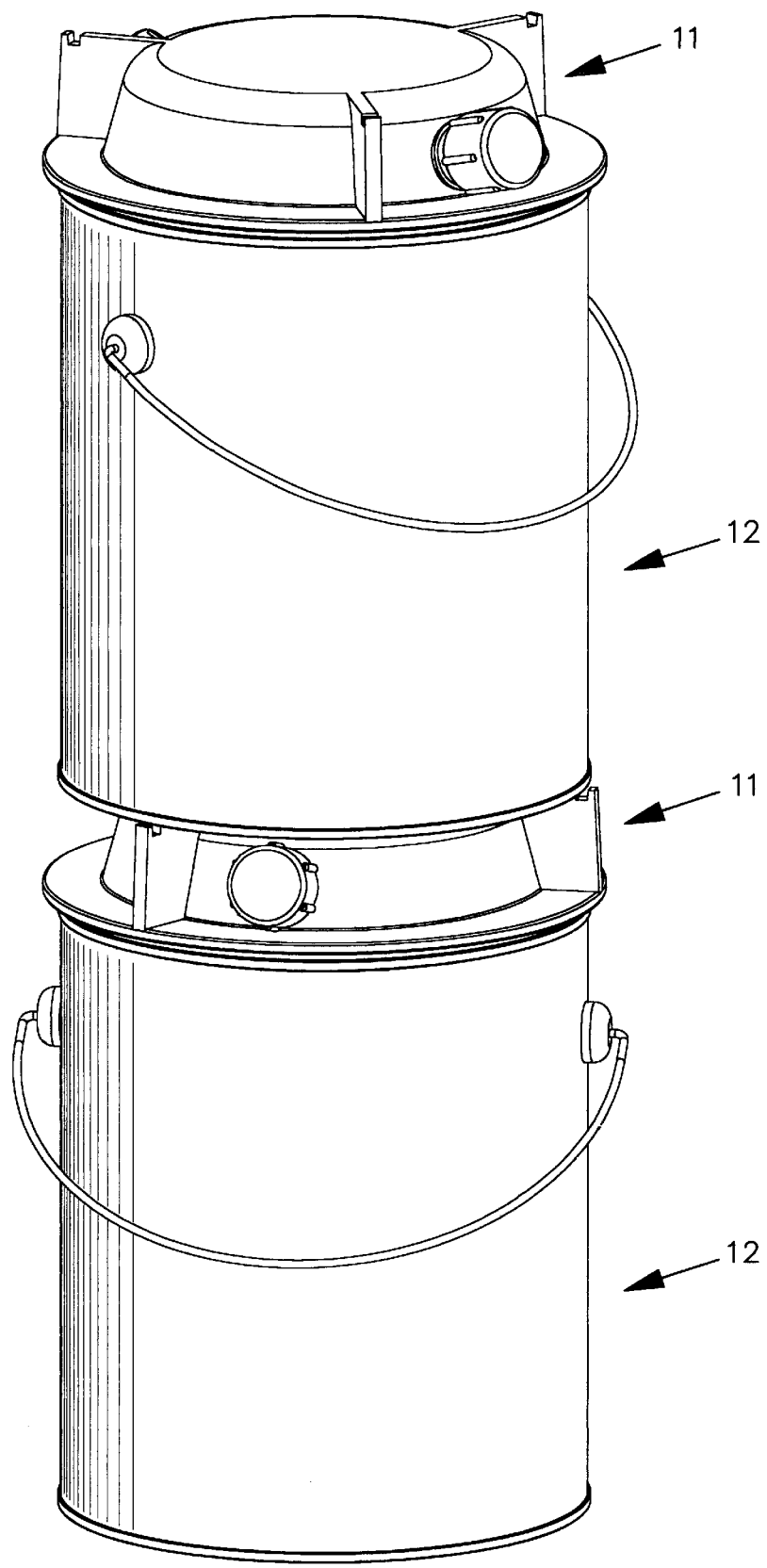
FIG. 6 shows how the continers stack on top of one another.

An alternate embodiment of cover 10 is illustrated as cover 11 in FIG. 5. In the primary embodiment of FIGS. 1 and 2, flat platform 38 usually serves as an adequate resting platform for stacking another container 12 on top of cover 10; however, in some circumstances, such as in a moving vehicle or shaky environment, the container 12 resting on platform 38 may move or shift slightly causing an off kilter, unstable stack that can topple and fall over; potentially causing a sizeable mess. In the embodiment of FIG. 5, all elements of alternate cover 11 are identical to that of FIG. 2, e.g. hub 33, base and lip 31, inclined side 35, beveled edge 37, first and second spouts 19 and 21, respectively, with respective screw on caps 27 and 29. The alternate embodiment of FIG. 5, however, provides for at least three stabilizing flanges 41 orthogonally coupling side 35 with lip 31. A positioning, retaining notch 43 in each flange 41 serves to grasp the bottom ring of a container 12 stacked on top of cover 11 as indicated in FIG. 6. In the perspective view of FIG. 6, it can be observed that several containers 12 may be thusly safely and securely mounted on top of each other in alternate cover 11 even in a shaky or moving environment.

Covers 10 and 11 are preferably constructed from a single injection mould process and fabricated from aluminum or other metal, as well as less expensive plastic, rubber or other similar strong and supportive composition. It should also be considered that spouts 18 and 20 with caps 26 and 28, respectively, may be snap on, or slide on type devices as an alternative to screw on type devices.

The foregoing description is considered as illustrative only of the principles of the invention. Since numerous modifications and changes will readily occur to those skilled in the art, it is not desired to limit the invention to the foregoing exact construction and operation as shown and described, and accordingly, all suitable modifications and equivalents may be resorted to, falling within the scope of the invention. Therefor, although the foregoing description of a preferred embodiment is disclosed to fulfill the requirement of making an enabling disclosure in sufficient detail to permit one of reasonable knowledge and skill in the art to make, use and sell the invention delineated herein, it will be understood that the breadth, depth and extent of the invention concept is not limited by the foregoing disclosure and constructive reduction to practice of the invention, but will be limited only by the following appended claims as interpreted, if necessary, by the foregoing description. Although the foregoing disclosure and drawing makes particular reference to a conventional gallon sized paint can container and application, it will be obvious that the invention concept herein disclosed will read on any similar larger and smaller containers of fluid, liquid or gas, semi fluid, viscous fluid or powder, as well.

What is claimed as being new and novel in view of the prior art, and desired to be protected by Letters Patent issued by the United States Patent and Trademark Office is as follows:

1. A reusable cover for mounting on top of a fluid container, comprising:
   platform means in the form of a severely truncated cone having inclined sides and a flat top for supporting and stacking another container thereon;
   means, disposed on said platform means for centering and locking a stacked container on top of a lower container;
   a plurality of different sized spouts emanating perpendicularly from said inclined sides of said platform means, said spouts having removable closure means;
   means for sealing said platform means from said container, wherein said sealing means consists of a peripheral male protruding ring for a snugly fit insertion into a peripheral female recessed ring of said container; and
   means for disengaging said platform means from said container, wherein said disengaging means consists of an elevated lip around the peripheral based of said platform means thereby causing a gap between said platform and the top of said container that can conveniently be pried open.

2. A dripless, spill proof fluid container cover, comprising;
   a base having a peripheral lip for engagement with said container;
   a platform with inclined sides concentrically disposed on said base;
   at least two different sized spouts extending from said platform wherein said spouts extend perpendicularly from said inclined sides and are provided with sealing caps; and
   cover disengagement means disposed between said peripheral lip and said container, wherein said disengagement means consists of a built in gap between said peripheral lip and top rim of said container, thereby enabling one to insert a screwdriver there between and easily snap off said cover.

3. A reusable paint can cover, comprising:
   a disc shaped base having a peripheral lip for engagement with said paint can;
   an elevated platform, concentrically disposed on said base;
   inclined sides connecting said platform with said base;
   a plurality of notched flanges disposed around the periphery of said platform for securing a paint can to said platform;
   at least two spouts emanating from and perpendicular to said inclined sides;
   cover engagement means disposed on said base for attaching and sealing said cover to said paint can; and
   cover disengagement means disposed between said peripheral lip and said paint can.

4. A paint can cover according to claim 3, wherein said platform consists of a truncated cone having a planar, flat top and inclined sides connecting said flat top to said base.

5. A paint can cover according to claim 4, wherein said spouts are each of a different size to be able to pass a larger or smaller volume of paint there through.

6. A paint can according to claim 5, wherein said engagement means consists of a peripheral protruding, male ring coupled to said cover for tightly fitting within the recessed, female groove around the rim of a typical paint can, thereby sealing off the contents of said can to prevent evaporation and pain hardening.

7. A paint can cover according to claim 6, wherein said disengagement means consists of a built in gap existing between said base lip and the peripheral rim of the paint can, thereby enabling one to insert a screwdriver there between and in turning said screwdriver conveniently snap said cover off the paint can.

8. A paint can cover according to claim 7, wherein said cover is molded in a single piece of string plastic.

9. A paint can cover according to claim 7, wherein said cover is made of metal.

* * * * *